(12) United States Patent
Miyahara

(10) Patent No.: US 7,245,323 B2
(45) Date of Patent: Jul. 17, 2007

(54) TRANSFERRING METHOD OF ELECTRIC CHARGE FROM IMAGE SENSING DEVICE AND THE IMAGE SENSING DEVICE

(75) Inventor: Hiroyuki Miyahara, Yokohama (JP)

(73) Assignee: Victor Company of Japan, Ltd., Yokohama (JP)

(*) Notice: Subject to any disclaimer, the term of this patent is extended or adjusted under 35 U.S.C. 154(b) by 728 days.

(21) Appl. No.: 10/354,100

(22) Filed: Jan. 30, 2003

(65) Prior Publication Data

US 2003/0160880 A1    Aug. 28, 2003

(30) Foreign Application Priority Data

Feb. 26, 2002    (JP)    ............... 2002-049419

(51) Int. Cl.
*H04N 3/14*    (2006.01)
*H04N 5/225*    (2006.01)

(52) U.S. Cl. .................................... 348/316; 348/220.1
(58) Field of Classification Search .................. None
See application file for complete search history.

(56) References Cited

U.S. PATENT DOCUMENTS 4,910,599 A * 3/1990 Hashimoto ............... 348/240.2
6,400,404 B2 * 6/2002 Hirota et al. ............... 348/316
6,721,009 B1 * 4/2004 Iizuka ......................... 348/314
6,900,837 B2 * 5/2005 Muramatsu et al. ........ 348/243
2002/0054228 A1 * 5/2002 Miyahara ..................... 348/312

FOREIGN PATENT DOCUMENTS

JP    06-205298    7/1994
JP    10-256522    9/1998

* cited by examiner

*Primary Examiner*—Lin Ye
*Assistant Examiner*—Luong T. Nguyen
(74) *Attorney, Agent, or Firm*—Connolly Bove Lodge & Hutz LLP (57) ABSTRACT

An image sensing device operates in a first and a second picture image mode. The image sensing device includes a pixel area having a first vertical transferring CCD to transfer a first electric charge converted from an optical image and a second vertical transferring CCD to transfer a second electric charge of optical black level respectively. The image sensing device includes a block portion for selectively blocking the first and second electric charge, wherein the first and second electric charges are outputted without block operation of the block portion and transferred to the horizontal CCD in the first picture image mode and wherein the block portion selectively blocks the first electric charge, and the first electric charge unblocked and the second electric charge are transferred to the horizontal CCD at different timing in a second picture image mode.

6 Claims, 6 Drawing Sheets

TRANSFERRING METHOD OF ELECTRIC CHARGE FROM IMAGE SENSING DEVICE AND THE IMAGE SENSING DEVICE

BACKGROUND OF THE INVENTION

1. Field of the Invention

The present invention relates to transferring method of electric charge from an image sensing device and the image sensing device preferable for obtaining image data of different picture size in accordance with still picture image mode and moving picture image mode.

2. Description of the Related Art

Figure 1:
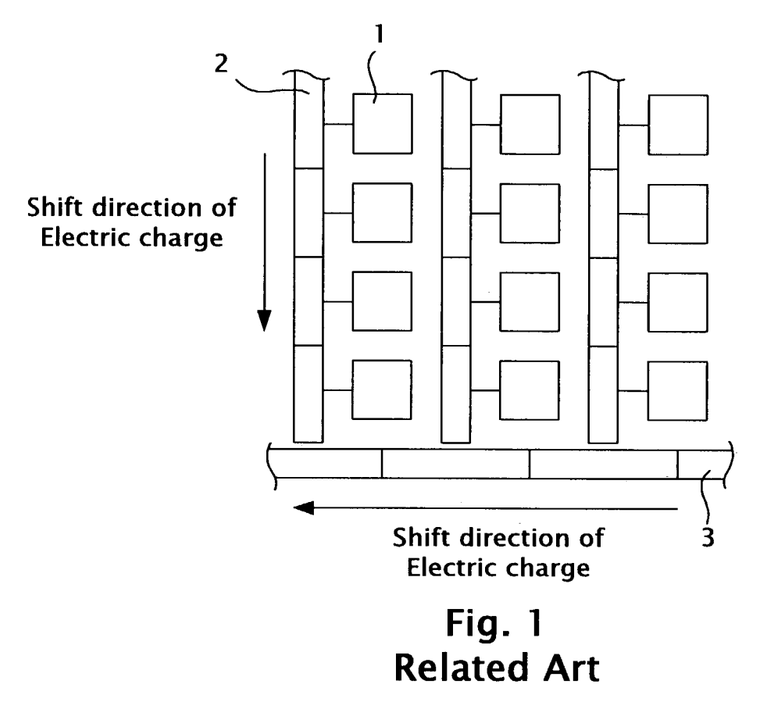
FIG. 1 is a partial plan view of a solid-state image sensing device in accordance with the related art.

A solid-state image sensing device for an image sensing device is used for a video camera. FIG. 1 is a partial plan view of an image sensing device. In FIG. 1, the image sensing device is composed of a plurality of photoelectric converters 1 for converting optical light into an electric charge, a vertical charge coupled device (hereinafter referred to as "VCCD") 2 for transferring an electric charge from the photoelectric converter 1 towards the arrow direction vertically, and a horizontal charge coupled device (hereinafter referred to as "HCCD") 3 for transferring the electric charge from the VCCD 2 towards the arrow direction horizontally.

The photoelectric converter 1 is disposed in horizontal and vertical direction of a predetermined pixel area in an array. A timing generator not shown provides the photoelectric converter 1 with a readout pulse to transfer the electric charges to adjacent VCCD 2. The VCCD 2 has a plurality of stages in vertical direction corresponding to vertical arrangement of the photoelectric converter 1. The VCCD 2 transfers electric charge to the next stages one by one in the timing of a vertical pulse generated from the timing generator not shown.

The HCCD 3 has a plurality of stages in horizontal direction corresponding to horizontal arrangement of the photoelectric converter 1. An electric charge transferred from the VCCD 2 is shifted to the horizontal direction by the timing of a horizontal pulse generated from the timing generator.

The electric charge generated in the photoelectric converter 1 is transferred to the VCCD 2 in predetermined timing, and is shifted to the HCCD 3. The electric charge transferred to the HCCD 3 is shifted to the horizontal direction to output all electric charges generated in the photoelectric converter 1, so that a single picture of an image signal is obtained.

SUMMARY OF THE INVENTION

It is an object of the present invention to provide a transferring method of an electric charge from an image sensing device and the image sensing device, which can output a still picture image and a moving picture image in a desirable picture image size respectively and can conduct a compensation process for a line information by using a horizontal OB information.

According to an aspect of the present invention, there provided a transferring method of an electric charge from an image sensing device including the steps of transferring a first electric charge from a plurality of first vertical transferring CCDs having a first photoelectric converter arranged in vertical and horizontal arrays in a pixel area, transferring a second electric charge of optical black level from a plurality of second vertical transferring CCDs having a second photoelectric converter arranged in vertical and horizontal arrays in an optical black area, and selectively blocking the first electric charge transferred from the pixel area, wherein the first and second electric charge are outputted without block operation in a first picture image mode, and wherein the first electric charge transferred from the pixel area is selectively blocked, and the first electric charge and the second electric charge are transferred at different timing in a second picture image mode.

According to another aspect of the present invention, there provided an image sensing device operates in a first and a second picture image mode, including a pixel area for having a first photoelectric converter arranged in vertical and horizontal arrays to convert an optical information into a first electric charge, and a first vertical transferring CCD to transfer the first electric charge from the first photoelectric converter towards the vertical direction, an optical black area (4, 5) for having a second photoelectric converter arranged in vertical and horizontal arrays to output a second electric charge of optical black level, and a second vertical transferring CCD to transfer the second electric charge from the second photoelectric converter towards the vertical direction, a horizontal CCD (3) for shifting a third electric charge transferred from the first and second vertical transferring CCDS, and a block portion (6, 7) for selectively blocking the first electric charge outputted from the pixel area, wherein the first and second electric charges are outputted without block operation of the block portion and transferred to the horizontal CCD in the first picture image mode and wherein the block portion selectively blocks the first electric charge, and the first electric charge unblocked and the second electric charge are transferred to the horizontal CCD at different timing in a second picture image mode.

Other object and further features of the present invention will be apparent from the following detailed description when read in conjunction with the accompanying drawings.

DETAILED DESCRIPTION OF THE PREFERRED EMBODIMENTS

First Embodiment

A solid state image sensing device is used in various imaging apparatuses such as a video camera, and an electronic still camera. There provided an imaging apparatus having a still picture image mode and a moving picture image mode which can obtain both still pictures and moving pictures. The still picture image mode obtains still image of high resolution by utilizing all photoelectric converters in a pixel area of image sensing device. The moving picture image mode obtains moving pictures of relatively low resolution by utilizing the photoelectric converter in a partial pixel area.

Figure 2:
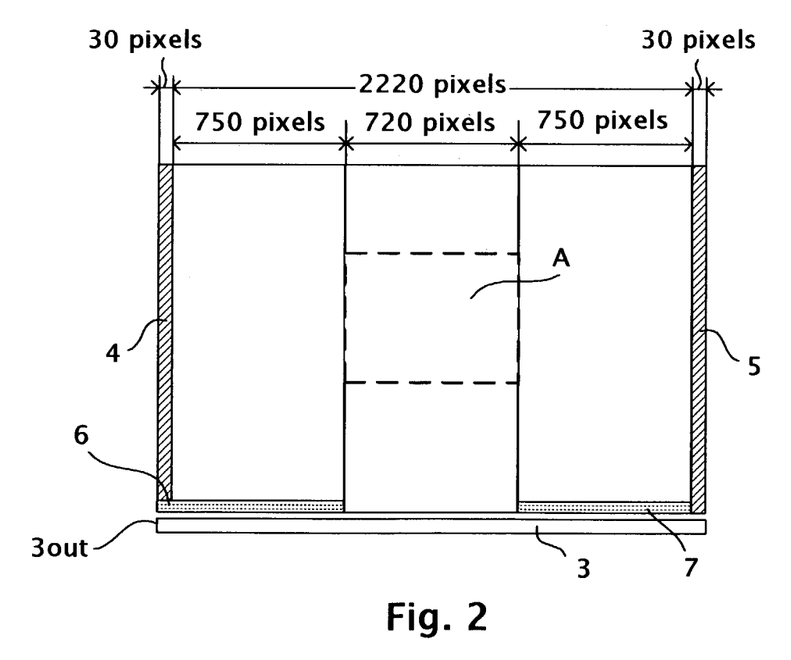
FIG. 2 shows an image sensing device which can operate in still picture image mode and moving picture image mode.

FIG. 2 shows an image sensing device which can operate in still picture image mode and moving picture image mode. In FIG. 2, the image sensing device is composed of a pixel area having a plurality of photoelectric converters 1, for example, 2200 pixels in horizontal direction, optical black portions 4 and 5 in both sides of the pixel area to determine black level of a picture image (having 30 pixels in horizontal direction), and blocking portions 6 and 7 to selectively block and transfer an electric charge to an HCCD 3, and output portion 3out which outputs the electric charge from the HCCD 3. The blocking portions 6 and 7 pass or block the electric charge towards the HCCD 3.

In the still picture image mode, the electric charge from the photoelectric converter 1 is utilized for a still picture image. In the moving picture image mode, the electric charge from partial pixel area A shown by dotted lines is utilized for moving picture images.

In the still picture image mode, all of the electric charges from the photoelectric converter 1 are transferred to the VCCD 2, and whole 2220 pixels plus 30 pixels in both sides (which is total 2280 pixels) are transferred to the HCCD 3. The HCCD 3 shifts the electric charges of 2280 pixels in horizontal direction. The VCCD 2 and HCCD 3 reiterate the transfer of electric charge to obtain a single still image signal. In this mode, the blocking portions 6 and 7 do not block electric charges from the VCCD 2 and pass all of them to the HCCD 3.

A horizontal optical black (HOB) portion outputs a reference signal of optical black for an image signal. The HOB portion is usually provided in both sides of the image sensing device which photoelectric converter is shielded with aluminum masking. The aluminum shield covers HOB portions from optical light so that the electric charge outputted from the HOB portion becomes optical black level for image signal. The electric charge is processed by reference of the optical black signal to compensate the black level of the image signal.

In the moving picture image mode, the blocking portions 6 and 7 block the electric charges from the VCCD 2 that only the electric charge in the pixel area A is transferred to the HCCD 3.

This is because of that the transferring rate is limited in moving picture image mode. If all the electric charges in whole 2220 pixels are transferred, transferring clock for VCCD and HCCD should be fast enough to shift all electric charges which affects the transferring efficiency. Low transferring efficiency causes poor image quality. Consequently, pixel size for moving picture image mode is limited to be smaller than the pixel size for still picture image mode.

Figure 3:
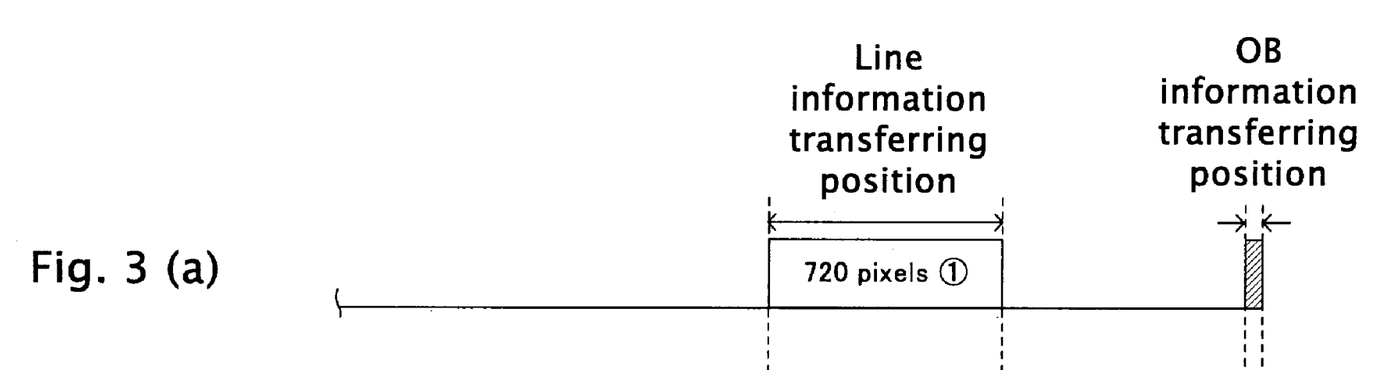
FIGS. 3(a) through 3(d) are charts for explaining electric charge transferred in the HCCD 3 in accordance with the related art.

FIGS. 3(a) to 3(d) are diagrams for explaining electric charge transferred in the HCCD 3. In FIG. 3(a), the electric charge generated in the pixel area A is transferred to the HCCD 3 as 720 pixels ① and the electric charge in the optical black portion (hereinafter referred to as "OB information") 5 is transferred to the HCCD 3 as a first line information. Then the HCCD 3 transfers the electric charge of the 720 pixels ① and the OB information in horizontal direction respectively.

The block portion 7 blocks or passes the electric charge for 750 pixels between the OB portion 5 and the pixel area A. In FIG. 3(b), the HCCD 3 shifts the 720 pixels ① and the OB information. Then 720 pixels ② is transferred to the HCCD 3 from the pixel area A as a second line information.

The length of electric charge to be transferred to the HCCD 3 from the pixel area A and the OB portion 5 is 750 pixels. The blocking operation of block portion 7 makes a space for shifting electric charge for 750 pixels as shown in FIG. 3(b).

In other words, there is a space in the HCCD 3 for 720 pixels between the OB information transferred simultaneously with the first line information in FIG. 3(a) and the OB information transferred simultaneously with the second line information in FIG. 3(b). As the HCCD 3 continues to shift electric charges equivalent to 720 pixels ③ and the OB information having 30 pixels are transferred to the HCCD 3 as a third line information in FIG. 3(c).

In FIG. 3(d), electric charges equivalent to 720 pixels ④ and the OB information having 30 pixels are transferred as a fourth line information.

As in the case of the image sensing device shown in FIG. 2, the horizontal pixel in which electric charge is transferred in the moving picture image mode should be at least 720 pixels. This is less than ⅓ of the whole pixel area. The transfer of electric charge in the OB portion enables compensation of line information. The size of transferring pixels maintains sufficient transferring rate for moving pictures.

As the OB portion has 30 pixels and the pixel area A has 720 pixels, the electric charge of 750 pixels is transferred to the HCCD 3 in every line. This means HCCD 3 needs a space for at least 750 pixels to be shifted between the electric charge of 720 pixels and the electric charge of OB portion.

The image sensing device indicated above transfers 720 pixels (which are almost one third of all pixel size) and the OB information together towards the horizontal direction, which enables compensation of the line information for signal processing and maintains sufficient transferring rate for moving picture.

As described above, the image sensing device transfers 720 pixels from the pixel area A in moving picture image mode, which mode requires a transferring space for 750 pixels between the 720 pixels and the OB information in the HCCD 3. In this sense, the image sensing device requires 750 pixels area in both sides of the pixel area A, and consequently, the whole pixel area becomes bigger (in this case, 2250 pixels).

In other words, the pixel area size to be used in the moving picture image mode is limited and can not be bigger without making the whole pixel area size bigger.

The pixel area size for the moving picture image mode can be enlarged to 1470 pixels by combining 720 pixel area with 750 pixel portion in either side of the image sensing device shown in FIG. 2. However, an optical center of the image sensing device in still picture image mode and the moving picture mode become physically different, that an optical axis of the moving picture image mode becomes off-center. In this sense, the center of the image sensing device should be adjusted that some kind of physical equipment to adjust the center is necessary which is burdensome.

The pixel area for the still picture image mode may also be used in the moving picture image mode by an extremely high speed driving pulse of HCCD 3 that the line information of 2220 pixels and the OB information can be outputted simultaneously. However, the higher driving pulse may adversely impact the transferring efficiency of the electric charge, which affects the image quality. In addition, more electric power may be consumed by higher driving pulse, which causes heat problem.

As described above, the image sensing device comply with still picture image mode and moving picture image mode has various limitations in moving picture image mode that the picture size of the moving picture image mode is extremely small compare to the picture size of the still picture image mode. Accordingly, it is difficult to obtain each still picture and moving picture in most preferable pixel size.

Second Embodiment

Figure 4:
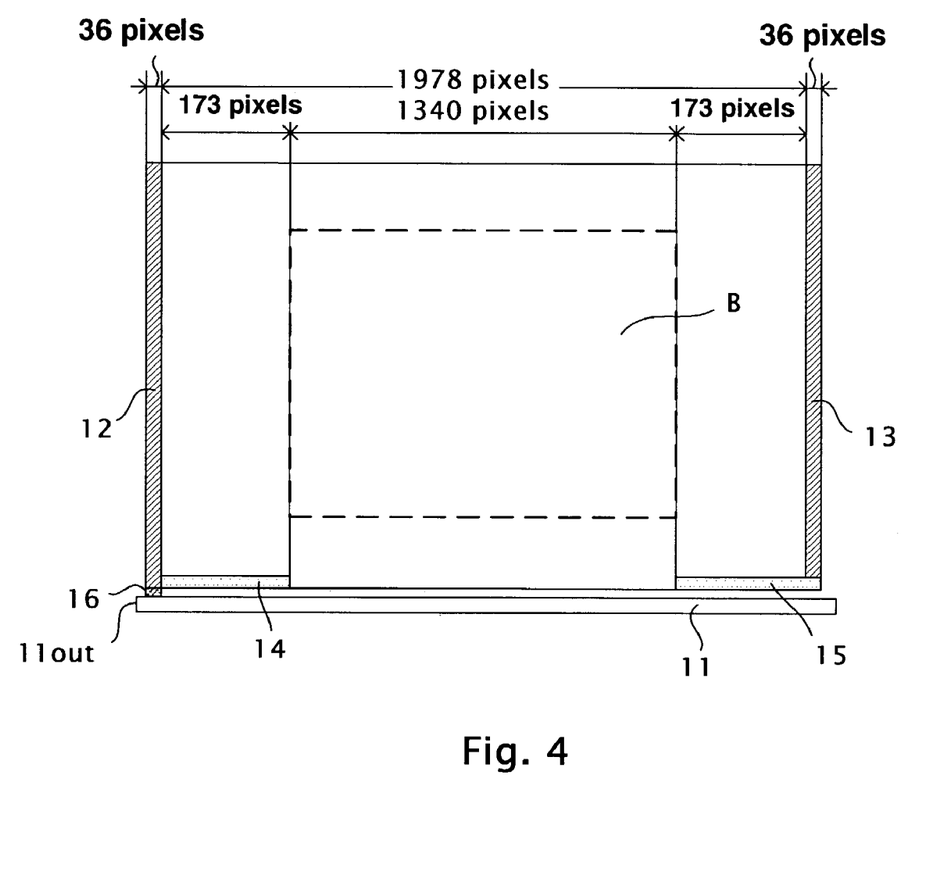
FIG. 4 is a plan view of an image sensing device in accordance with a first embodiment of the present invention.

FIG. 4 is a plan view of an image sensing device in accordance with a second embodiment of the present invention. In FIG. 4, the image sensing device is composed of a pixel area having 1978 pixels, a HCCD 11 for shifting an electric charge to an output portion 11 out, two horizontal optical black (HOB) portions 12 and 13 in both ends of the 1978 pixel area, two blocking portions 14 and 15 to selectively block and transfer the electric charge to the HCCD 11, and a register 16 to transfer a delayed electric charge from a VCCD not shown in the HOB portion 12.

The pixel area has a plurality of photoelectric converters not shown to obtain an electric charge converted from an optical image, and a VCCD not shown to transfer the electric charge from the photoelectric converter to the HCCD 11. The pixel area is divided into a pixel area B and 173 pixel areas in each left and right sides of the pixel area B.

In FIG. 4, the pixel area B is shown by dotted lines. Almost all photoelectric converters in the whole pixel area is utilized for outputting a still image signal in the still picture image mode, and the photoelectric converter in the pixel area B is utilized for outputting a moving picture image signal in the moving picture image mode.

In the moving picture image mode, the block portions 14 and 15 block the electric charge in both the 173 pixel areas and the HOB portion 13.

Figure 5:
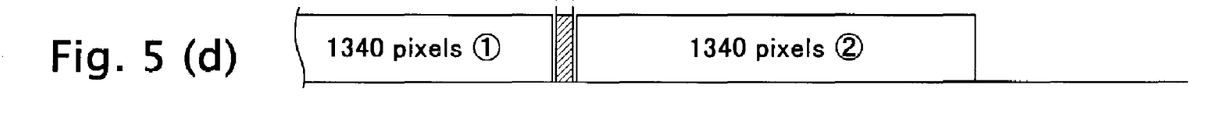
FIGS. 5(a) through 5(d) are charts for explaining an operation of the image sensing device in accordance with the first embodiment of the present invention.

Accordingly, the electric charges in the pixel area B and HOB portion 12 are transferred to the HCCD 11. FIGS. 5(a) through 5(d) show an operation of an image sensing device in accordance with the second embodiment of the present invention. In FIG. 5(a), an electric charge generated in the pixel area B as a first line information is transferred to the HCCD 11 as shown 1340 pixels ①. Electric charges in both the 173 pixel areas and the HOB portion 13 are blocked. An electric charge in the HOB portion 12 (having 36 pixels) is transferred to the register 16.

In FIG. 5(b), the electric charge transferred in the HCCD 11 is shifted towards the horizontal direction. Simultaneously, the electric charge in the register 16 is transferred to the HCCD 11. As described above, a predetermined driving pulse for the register 16 delays the timing of transferring an electric charge. The driving pulse is generated from a timing generator not shown and can be created by a horizontal pulse to be supplied to the HCCD 11.

As an electric charge in the HCCD 11 is shifted, an electric charge generated in the pixel area B as a second line information is transferred to the HCCD 11 as shown as 1340 pixels ② in FIG. 5(c).

The electric charges in the pixel area B and HOB portion 12 is alternately transferred to the HCCD 11. 1340 pixels ② are transferred to the HCCD 11 so as to make a space of 36 pixels between the 1340 pixels ① and ②. In FIG. 5(d), the electric charge in the HOB portion 12 is then transferred to the space between 1340 pixels ① and ② in the HCCD 11.

Subsequent electric charges in the pixel area B and in the HOB portion 12 are transferred to the HCCD 11 and all line information in the pixel area B is outputted. All line information constitute one picture image. A moving picture can be created by outputting 60 of such the picture images in one second. Accordingly, the picture image information with HOB information can be outputted to constitute a moving picture.

As indicated above, in the moving picture image mode, the HOB information corresponding to the first line information, the electric charge for the first line (i.e. 1340 pixels ①), the HOB information corresponding to the second line information, and the electric charge for the second line (i.e. 1340 pixels ②) are outputted sequentially. The HOB information is shifted with the corresponding line information, so that the line information can be compensated by a signal processing circuit not shown with reference to the HOB information.

In the still picture image mode, the block portions 14 and 15 do not block the electric charge in the VCCD 2 in the pixel area that all the electric charges are transferred to the HCCD 11. The electric charge in the HOB portion 12 is transferred to the HCCD 11 through the register 16, which delays for a short period of time. Accordingly, the horizontal shift in the HCCD 11 is conducted after the electric charge from the HOB portion 12 is transferred.

The electric charge transferred to the HCCD 11 is shifted to the horizontal direction and outputted through the 11out portion. Then next line information is transferred to the HCCD 11. All line information are transferred by the steps described above, together with the HOB information for compensation of the line information to output, and the still picture information.

In the still picture image mode, the electric charge from the HOB portion 12 can directly be transferred to the HCCD 11. In this sense, all the electric charges in the HOB portions 12 and 13 as well as the pixel portion B can simultaneously be transferred to the HCCD 11 without controlling the timing of horizontal shift in the HCCD 11.

In the moving picture image mode, the electric charge in the HOB portion 12 can directly be transferred to the HCCD 11 by supplying different phases of a vertical pulse to the HOB portion 12 and to the other pixel portion respectively. In this sense, the register 16 can be omitted. The driving pulses having different phases change the timing of transferring the electric charge from each HOB portion 12 and the other pixel area. In the still picture image mode, each driving pulse to be supplied to each pixel area has the same phase.

Figure 6:
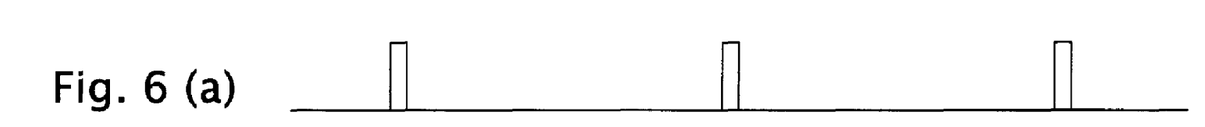
FIGS. 6(a) and 6(b) show a driving pulse for a pixel area and for a HOB portion respectively.

Specifically, for example, the driving pulse as shown in FIG. 6(a) is provided to the pixel area other than the HOB portion 12. Then the driving pulse as shown in FIG. 6(b) is provided to the HOB portion 12. The phase difference between the driving pulses shown in FIG. 6(a) and 6(b) is set to the period of time to shift the line information (such as 1340 pixels ①) as shown in FIG. 5(a) to the position shown in FIG. 5(b).

Third Embodiment

Figure 7:
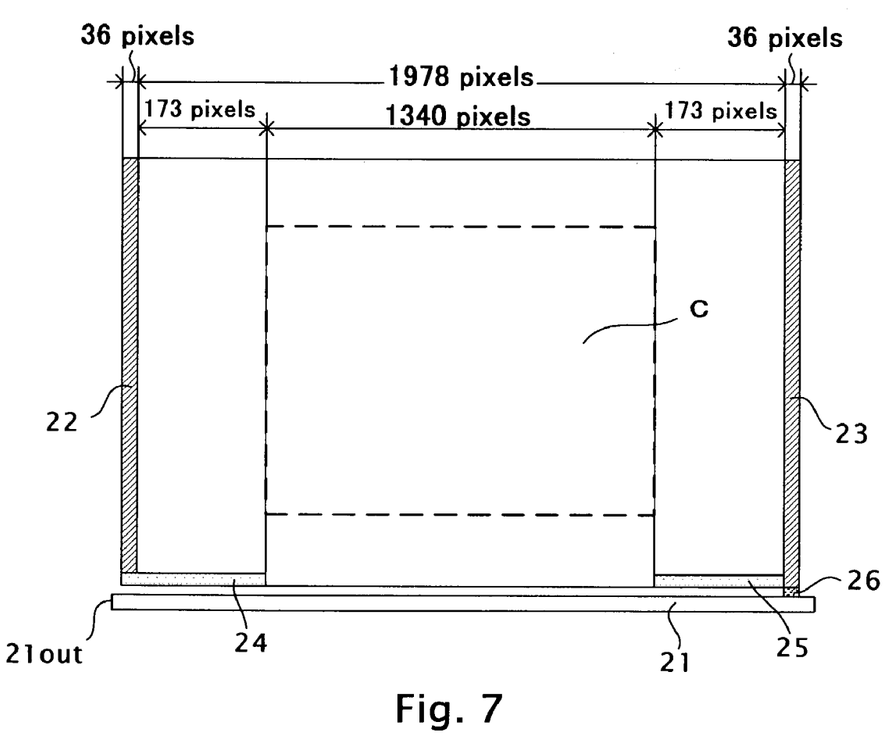
FIG. 7 is a plan view of an image sensing device in accordance with a second embodiment of the present invention.

FIG. 7 is a plan view of an image sensing device in accordance with a third embodiment of the present invention. In FIG. 7, an image sensing device is composed of a pixel area divided in pixel areas of 173 pixels and a pixel area C of 1340 pixels (shown by dotted lines), two horizontal OB (HOB) portions 22 and 23 for generating an electric charge for an optical black reference signal, a HCCD 21 for outputting the electric charge transferred from the pixel areas to a 21out portion, two block portions 24 and 25 for blocking the electric charge transferred from the 173 pixel areas in the moving picture image mode, and a register 26 for outputting a delayed electric charge from the HOB portion 23. The pixel areas have photoelectric converter not shown to generate an electric charge by receiving an optical image, and a VCCD 2 not shown to transfer the electric charge to the vertical direction.

The image sensing device in accordance with the third embodiment has the pixel area of 1978 pixels and a pixel area C in the center of the pixel area that, in the still picture image mode, whole pixel area is used for transferring an electric charge, and that, in the moving picture image mode, the pixel area C is used for transferring the electric charge. As described above, the pixel area and the HOB portions 22 and 23 have a photoelectric converter and a VCCD (as shown in FIG. 1) An electric charge generated in the photoelectric converter is transferred to the HCCD 21 through the VCCD in the pixel area.

In this sense, the third embodiment provides basically a same image sensing device as described in the second embodiment, with a change in HOB portions 22 and 23, the block portions 24 and 25, and the register 26.

In the moving picture image mode, the photoelectric converter in the pixel areas generates an electric charge converted from an optical image. The VCCD in the pixel area transfers the electric charge to the HCCD 21. However, the block portions 24 and 25 block the electric charge from the 173 pixel areas and the HOB portion 22 respectively. In this sense, only an electric charge from the pixel area C is transferred to the HCCD 21.

The third embodiment utilize an electric charge from the HOB portion 23 that the electric charge is transferred to the register 26.

Figure 8:
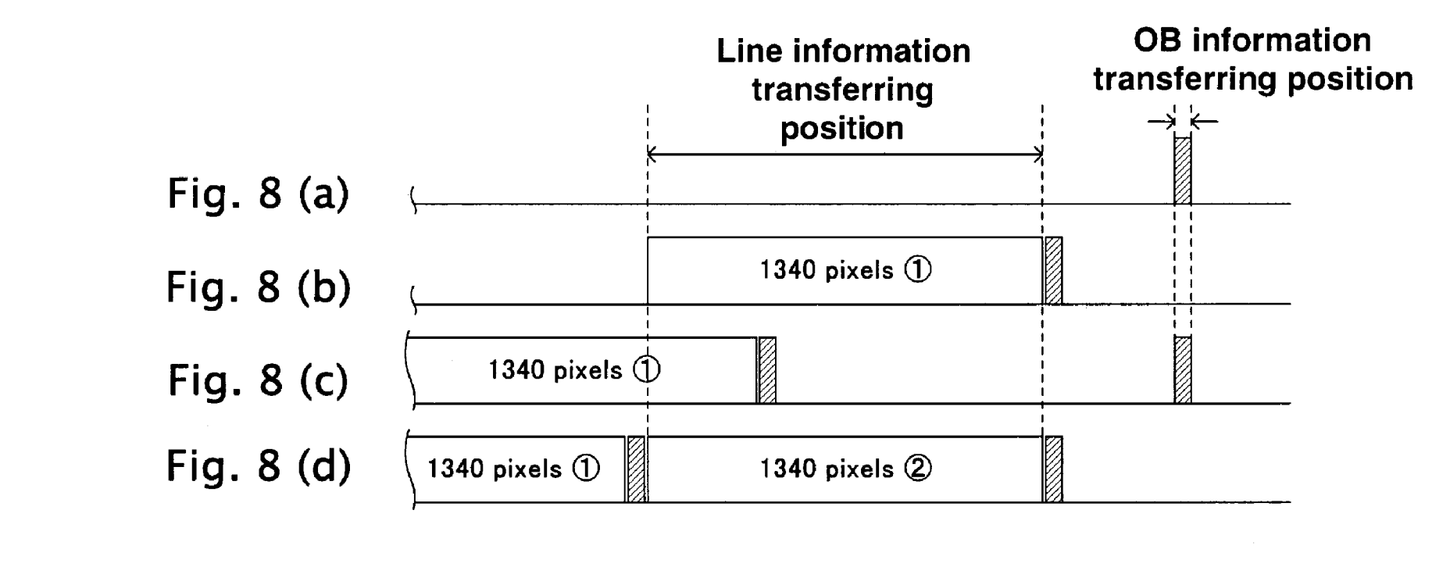
FIGS. 8(a) through 8(d) are charts of an electric charge transferred in a HCCD for explaining an operation of the image sensing device in accordance with the second embodiment of the present invention.

FIGS. 8(a) through 8(d) are charts of electric charge transferred in a HCCD for explaining [the] an operation of the image sensing device in accordance with the third embodiment. In FIG. 8(a), an electric charge in the HOB portion 23 is transferred to the HCCD 21.

In FIG. 8(b), the electric charge from the HOB portion 23 is shifted to a predetermined position in the HCCD 21, and simultaneously, an electric charge of 1340 pixel ① as a first information is transferred to the HCCD 21. The electric charge having the same vertical position of the 1340 pixel ① is transferred to the register 26.

In FIG. 8(c), the electric charge in the register 26 is transferred to the HCCD 21 and the 1340 pixels ① and an electric charge from the HOB portion 23 in the HCCD 21 are shifted to the predetermined position in the HCCD 21. Accordingly, line information and OB information in the same vertical position are not transferred to the HCCD 21 at the same timing. In addition, a space between an OB information shifted and another OB information transferred in the HCCD 21 is kept for 1340 pixels.

In FIG. 8(d), the 1340 pixel in a next (second) line information is transferred to the HCCD 21, and simultaneously, the OB information transferred from the register 26 generated with the first line information is shifted to the predetermined position in the HCCD 21. The pair of line information and the OB information are supplied to a signal processor not shown through the output portion 21 out. The image signal obtained by the signal processor is compensated by reference of the OB information supplied together with the line information.

As described above, a timing pulse for transferring an electric charge from the pixel area C to the HCCD 21 and another timing pulse for transferring an electric charge from the HOB portion 23 to the HCCD 21 are different that predetermined driving pulse is provided to the register 26 to transfer an electric charge in the 1340 pixels ② just before the electric charge in the HOB portion 23 is transferred.

Subsequently, the electric charge from each of the pixel area C and the HOB 23 is alternately transferred to the HCCD 21 and the other electric charge in all the lines of the pixel area C is outputted. The outputted electric charge constitutes data for one picture image. If the data is serially outputted for 60 pictures in one second, the outputted data constitutes a moving picture as described in the second embodiment. In this case, the electric charge in every line of the pixel area C and the HOB information for compensating the line are alternately outputted as a moving picture information.

As described above, the moving picture image mode of the third embodiment outputs an electric charge in the first line (1340 pixel ① shown in FIG. 8), and the HOB information corresponding to a line prior to the first line, and an electric charge in the second line (1340 pixel ② shown in FIG. 8), and the HOB information corresponding to the first line alternately. In compensation of the line information utilizing the HOB information, an output order of the line information and the HOB information is exchanged to make a pair.

In the still picture image mode, an electric charge to be transferred from the VCCD 2 is not blocked by the block portions 24 and 25 that all electric charges from the 1978 pixel area and the HOB portion 22 are transferred to the HCCD 21. The electric charge from the HOB portion 23 is transferred through the register 26, which causes a slight delay. Accordingly, the horizontal shift of the electric charge is conducted after the electric charge is transferred to the HCCD 21.

The electric charge transferred to the HCCD 21 is shifted to the horizontal direction towards the output portion 21out. Then the electric charge of the next line is transferred to the HCCD 21. The electric charge in all lines is continuously outputted until all electric charges are transferred. The HOB information for compensation of the line information is also outputted.

The horizontal shift of the HCCD 21 is suspended until an electric charge in the HOB portion 23 is transferred to the HCCD 21. If the electric charge is directly transferred from the HOB portion 23 to the HCCD 21 in still picture image mode, all electric charges in the 1978 pixel area including the HOB portions 22 and 23 can be transferred to the HCCD 21 at the same timing. In this sense, it becomes not necessary to suspend the horizontal shift in the HCCD 21.

The electric charge in the HOB portion 23 may be directly transferred to the HCCD 21 without supplying through the register 26.

In this sense, a vertical pulse having a different phase is provided to each VCCD 2 in the HOB portion 23 and the other pixel areas in the moving picture image mode, and the same vertical pulse is provided to the VCCD 2 in all pixel areas including the HOB portion 23.

Figure 9:
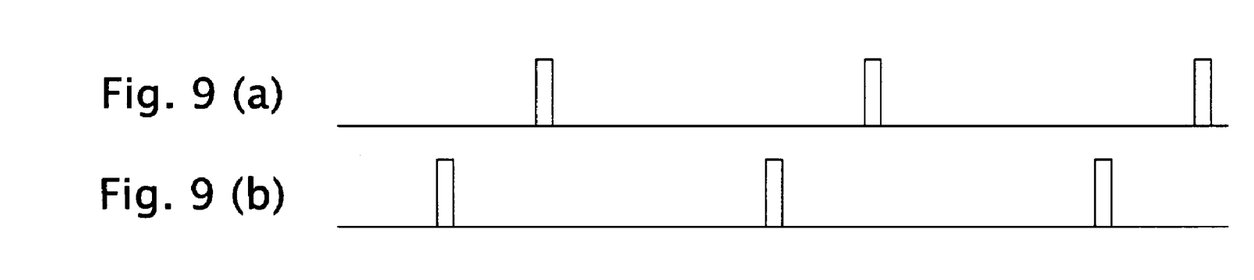
FIGS. 9(a) and 9(b) are timing charts of a vertical pulse to be provided to a portion other than a HOB portion and to the HOB portion in a pixel area respectively.

FIGS. 9(a) and 9(b) are timing chart of a vertical pulse to be provided in a pixel area other than the HOB portion, and the HOB portion respectively. For example, in the moving picture image mode, a vertical pulse shown in FIG. 9(a) is provided to pixel areas other than the HOB portion 23. Another vertical pulse shown in FIG. 9(b) has a phase shifted from the vertical pulse shown in FIG. 9(a), and the other vertical pulse is provided to the HOB portion 23. A phase difference is set up for a time to shift 36 pixels in the HCCD 21 from the position shown in FIG. 8(a) to the position shown in FIG. 8(b)

As described above, the image sensing device for having the still picture image mode and the moving picture image mode can output a moving picture image of a predetermined picture size without limitation of a pixel size.

As in the case described in FIGS. 4 through 7, the moving picture is outputted in 1340 pixels horizontally, the output image signal can be utilized not only for a standard video signal comply with the NTSC format but also for a video signal having even more high resolution (such as Hi-Definition TV "HDTV"). In addition, when the output signal is used for a standard video signal, an outer margin of image data can be utilized for various other purposes to improve image quality such as for image stabilization (which eliminates shaking of camera).

As described above, the image sensing device having the first and second image modes where the first image mode utilizes a full pixel area and the second image mode utilizes a lesser pixel area, a picture size can effectively set in the second image mode.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. An image sensing device operating in a still picture image mode and a moving picture image mode, comprising:
    a pixel area having a plurality of first photoelectric converters arranged in vertical and horizontal arrays to convert optical information into a first electric charge, and a first vertical transferring CCD to transfer the first electric charge from the plurality of first photoelectric converters towards the vertical direction;
    an optical black area having a plurality of second photoelectric converters arranged in vertical and horizontal arrays to output a second electric charge of optical black level, and a second vertical transferring CCD to transfer the second electric charge from the plurality of second photoelectric converters towards the vertical direction;
    a horizontal CCD for shifting the first and second electric charges transferred from the first and second vertical transferring CCDs; and
    a block portion for selectively blocking some of first electric charges outputted from a first area in the pixel area; and
    a delay means for delaying timing to transfer the second electric charge from the second vertical transferring CCD in the optical black area to the horizontal CCD by a predetermined time period, wherein the second electric charge is transferred immediately before the horizontal CCD transfers an electric charge from a second area in the pixel area excluding the first area,
    wherein the first and second electric charges are outputted without block operation of the block portion as picture image information and transferred to the horizontal CCD and the second electric charge from the second vertical transferring CCD is transferred to the horizontal CCD without delay operation of the delay means in the still picture image mode; and
    wherein the block portion selectively blocks the first electric charge in the moving picture image mode, and further wherein the second electric charge from the second vertical transferring CCD in the optical black area is transferred to the horizontal CCD by shifting timing of transferring the first electric charge from the first vertical transferring CCD in the pixel area towards the horizontal CCD and the second electric charge from the second vertical transferring CCD in the optical black area towards the horizontal CCD by the predetermined time period immediately before the some of electric charges from the second area in the pixel area excluding the first area is outputted in the moving picture image mode.

2. The image sensing device as claimed in claim 1, wherein a same driving pulse is supplied to the first and the second vertical transferring CCDs in the still picture image mode, and another driving pulse having a different phase from the same driving pulse is supplied to the first and second vertical transferring CCDs in the moving picture image mode.

3. The image sensing device as claimed in claim 1, wherein the second area positions in the center of the pixel area and the first area positions to the left and right of the second area.

4. A method for transferring an electric charge from an image sensing device operating in still picture image and a moving picture image modes comprising the steps of:
    creating a pixel area having a plurality of first photoelectric converters arranged in vertical and horizontal arrays;
    converting optical information into a first electric charge;
    transferring the first electric charge from the plurality of first photoelectric converters towards the vertical direction by means of a first vertical transferring CCD;
    creating an optical black area having a plurality of second photoelectric converters arranged in vertical and horizontal arrays to output a second electric charge of optical black level;
    transferring the second electric charge from the plurality of second photoelectric converters towards the vertical direction by means of a second vertical transferring CCD;
    shifting the first and second electric charges transferred from the first and second vertical transferring CCDs by means of a horizontal CCD;
    creating a block portion for selectively blocking first electric charges outputted from a first area in the pixel area;
    delaying the transfer of the second electric charge from the second vertical transferring CCD in the optical black area to the horizontal CCD by a predetermined time period, wherein the second electric charge is transferred immediately before the horizontal CCD transfers an electric charge from a second area in the pixel area, excluding the first area;
    wherein the first and second electric charges are outputted without block operation of the block portion as still picture image information and transferred to the horizontal CCD;
    transferring the second electric charge from the second vertical transferring CCD to the horizontal CCD without delay operation in the still picture image mode;
    wherein the block portion selectively blocks the first electric charge in the moving picture image mode; and
    further wherein the second electric charge from the second vertical transferring CCD in the optical black area is transferred to the horizontal CCD by shifting the timing of transferring the first electric charge from the first vertical transferring CCD in the pixel area towards the horizontal CCD and the second electric charge from the second vertical transferring CCD in the optical black area towards the horizontal CCD, the timing shift being a predetermined time period immediately before electric charges from the second area in the pixel area, excluding the first area, is outputted in the moving picture image mode, resulting in the first electric charge and the second electric charge being transferred at different times in the moving picture mode.

5. The transferring method as claimed in claim 4, wherein a same driving pulse is supplied to the first and the second vertical transferring CCDs in the still picture image mode, and another driving pulse having a different phase from the same driving pulse is supplied to the first and second vertical transferring CCDs in the moving picture image mode.

6. The transferring method as claimed in claim 4, wherein the second area is positioned in the center of the pixel area and the first area is positioned to the left and right of the second area.

* * * * *